United States Patent [19]

Washburn et al.

[11] 4,081,630
[45] Mar. 28, 1978

[54] TELEPHONE DISABLING DEVICE

[76] Inventors: Joseph W. Washburn, 16562 Iris Dr.;
Thomas A. Ashton, 9659 Cypress
Ave., both of Fontana, Calif. 92335

[21] Appl. No.: 759,431

[22] Filed: Jan. 14, 1977

Related U.S. Application Data

[62] Division of Ser. No. 669,234, Mar. 22, 1976, abandoned.

[51] Int. Cl.² .................................... H04M 1/66
[52] U.S. Cl. .................................... 179/189 R
[58] Field of Search .................................... 179/189 R

[56] References Cited

U.S. PATENT DOCUMENTS

| 3,301,969 | 1/1967 | Darling | 179/189 R |
| 3,469,041 | 9/1969 | Winston | 179/189 R |
| 3,823,277 | 7/1974 | Rudolph | 179/189 R |

Primary Examiner—David L. Stewart
Attorney, Agent, or Firm—Herbert E. Kidder

[57] ABSTRACT

A telephone disabling device for preventing outgoing calls while permitting a two-way conversation includes a disabling member having a cover portion extending over the dialing device. The member is hooked under a forward part of the telephone and the rear end thereof extends between the laterally spaced uprights forming the hand set cradle. A key lock carried by the disabling member is extendible into a rearwardly opening cavity in the telephone to prevent removal of the member. A modified form of disabling device prevents both outgoing calls and two-way conversation.

1 Claim, 7 Drawing Figures

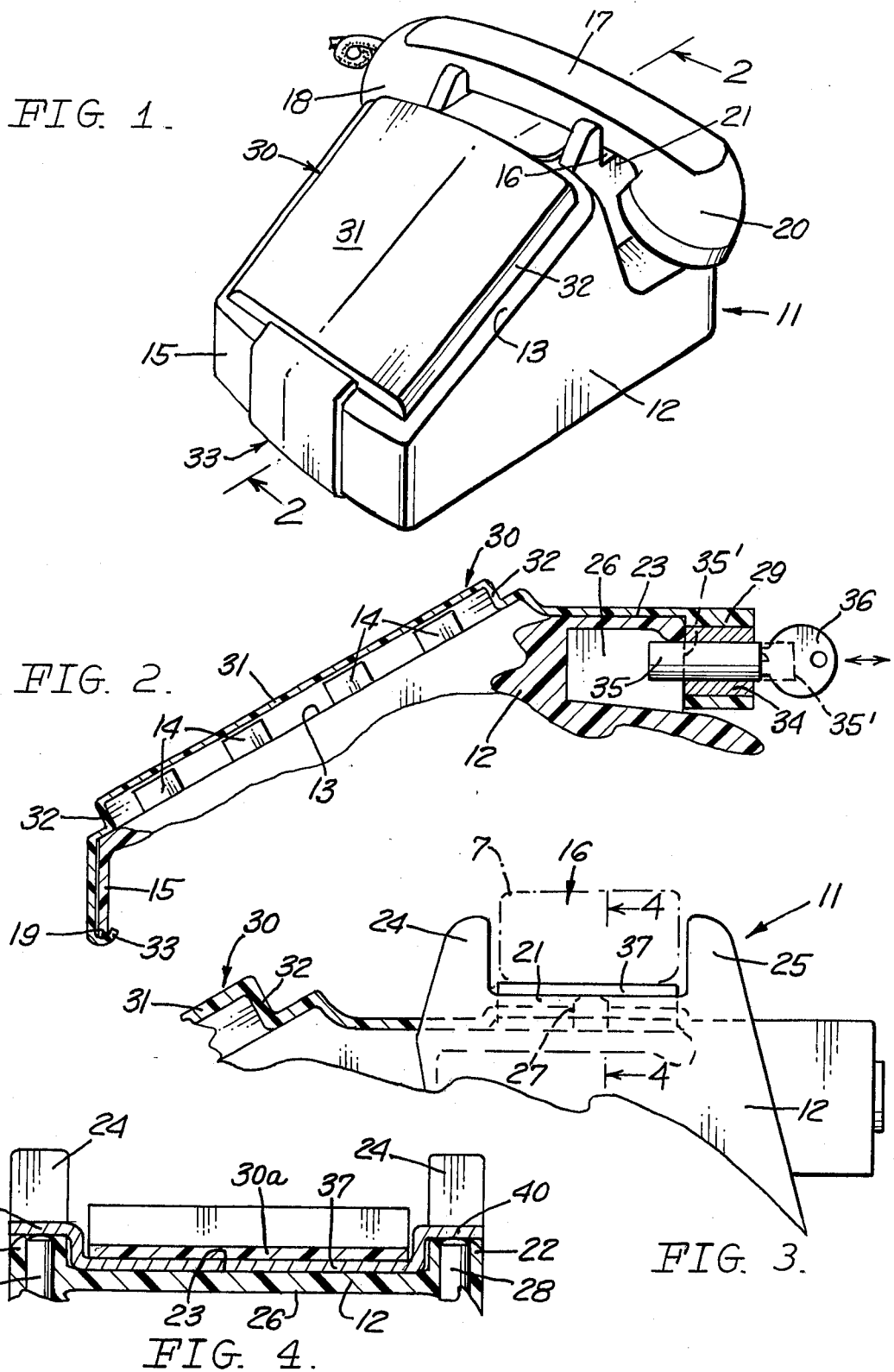

TELEPHONE DISABLING DEVICE

This is a division of application Ser. No. 669,234, filed Mar. 22, 1976, now abandoned.

BACKGROUND OF THE INVENTION

1. Field of the Invention

This invention relates to telephone disabling devices and has particular reference to lockable means for selectively preventing outgoing calls from being made by unauthorized persons.

2. Description of the Prior Art

Present day telephone systems normally permit toll calls as well as local calls be made by means of the conventional telephone sets having dialing devices comprising either depressible touch tone keys or finger operated dials. Thus, small children or other unauthorized persons may inadvertently or otherwise accumulate substantial toll charges which the subscriber may be charged for.

Heretofore, lockable telephone disabling devices have usually taken the form of a key lock insertable in a finger opening of a finger operated telephone dial. However, such disabling devices can be circumvented by proper repetitive depression of the hand set control switch plungers. Also, such devices cannot be used with touch tone telephones utilizing depressible keys for making outgoing calls.

Other lockable telephone disabling devices have been proposed utilizing a device for holding depressed the hand set controlled switch plungers. Although such devices are generally satisfactory in preventing outgoing calls, they also prevent two-way conversation.

Still other lockable telephone disabling devices have been proposed comprising lockable switch means for opening or closing the telephone circuits. These generally require physical modification of the telephone and certain electrical connections which could possibly interfere with the telephone circuitry.

SUMMARY OF THE INVENTION

A principal object of the present invention is to selectively prevent unauthorized outgoing calls over a telephone.

Another object is to prevent outgoing calls from being made over a telephone while permitting incoming calls to be received and a two-way conversation had.

Another object is to provide a device for selectively preventing either outgoing calls from being made or preventing both outgoing cals and a two-way conversation from being held.

A further object is to provide a telephone disabling device which does not require alteration of a telephone.

A further object is to provide a telephone disabling device which does not require connection to the telephone circuits.

Another object is to provide a simple, inexpensive and easily installed telephone disabling device.

A further object is to provide a telephone disabling device which can be readily modified to adapt the same to different types of telephones.

BRIEF DESCRIPTION OF THE DRAWINGS

The manner in which the above and other objects of the invention are accomplished will be readily understood on reference to the following specification when read in conjunction with the accompanying drawings wherein:

FIG. 1 is a perspective view of a telephone of the touch tone keyboard type, embodying a form of the invention described and claimed in our prior application Ser. No. 669,234, filed Mar. 22, 1976, now abandoned.

FIG. 2 is a sectional view through the upper part of the TouchTone telephone of FIG. 1 and illustrating the lockable disabling device of the present invention, and is taken substantially along the line 2—2 of FIG. 1.

FIG. 3 is a fragmentary side view of the upper part of the telephone, illustrating a modified form of disabling device in place and also illustrating the switch plunger depressing member in place.

FIG. 4 is a transverse sectional view taken along the line 4—4 of FIG. 3.

DESCRIPTION OF THE PREFERRED EMBODIMENT

Figure 5:
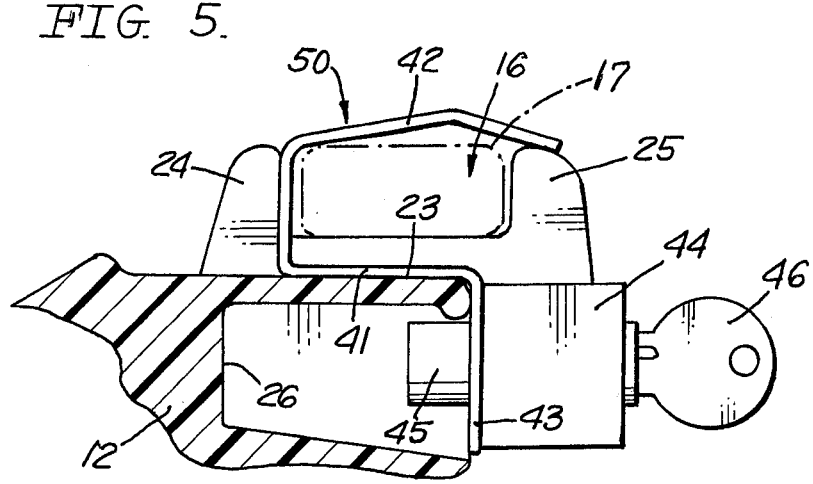
FIG. 5 is a fragmentary sectional view, similar to FIG. 2, through the upper part of a telephone, but illustrating the form of the invention with which the present application is concerned.

Referring in particular to FIGS. 1 and 2, a Touch-Tone type telephone 11 is shown comprising a pedestal or body 12 including a sloping keyboard surface 13 through which a series of depressible TouchTone keys 14 project, the keys forming means for dialing outgoing calls. The body 12 terminates at its forward end in a rigid downwardly extending skirt 15 forming a ledge 19 at the bottom thereof.

A cradle 16 is formed on the body 12 to receive a handset 17 in which is mounted the usual transmitter 18 and a receiver 20. The cradle 16 is formed by transversely spaced ledges 21 and 22 (FIGS. 3 and 4) which extend above the level of an intermediate surface 23. A pair of spaced uprights 24 and 25 are formed at the opposite ends of the ledges 21 and 22 to cradle the handset 17.

A hand hold is provided to facilitate carrying of the telephone and comprises a rearwardly opening cavity 26, FIG. 2, formed in the body portion 12 directly below the cradle 16.

The usual spring raised switch plungers 27 and 28, FIGS. 3 and 4, are slideably mounted in the ledges 21 and 22, respectively, for vertical movement and are suitably connected to telephone circuit switches (not shown). When the handset 17 is mounted in its cradle, the plungers 27 and 28 are depressed, setting the switches to condition the telephone circuits to receive incoming call signals. When the handset 17 is removed from its cradle, the plungers rise, conditioning the telephone circuits to transmit outgoing calls and to enable a two-way conversation.

According to the present invention, means are provided to prevent an unauthorized person from making outgoing calls while permitting incoming calls and two-way conversation. For this purpose, a disabling or cover member 30, preferably of relatively rigid plastic, is formed to rest against the keyboard surface 13 and has a rectangular cover portion 31 held in spaced relation over the various TouchTone keys 14 by surrounding walls 32. The forward end of the cover member 30 extends downwardly along the skirt 15 and terminates in a rearwardly extending hook 33 which, when the cover member is in place, hooks under the bottom edge 19 of the skirt 15. The rear portion of cover member 30 extends between the two pairs of cradle uprights, i.e. 24, 25, and rests on the surface 23 of the telephone body 12. This portion of the member 30 is of less thickness than the height of ledges 21 and 22 above the surface 23 so that it does not interfere with control of the switch plungers 27 and 28 by the handset when in its cradle 16.

Member 30 terminates in a downwardly extending boss 29 carrying a slide bearing 34. A cylinder lock 35 of conventional construction is slideably mounted in the bearing 34 and is provided with a suitable key way to receive an insertable key 36. When the key 36 is inserted in the lock 35, the latter can be slid between its full line position of FIG. 2 where it projects into the cavity 26 and its dotted line position 35' where it is removed from such cavity. When the key 36 is removed, the lock 35 will remain locked in either of such positions.

When it is desired to prevent unauthorized persons from making outgoing calls, the cover member 30 is located in place as shown in FIG. 2 with the hook 33 underlying the lower edge of skirt 15 and the lock 35 is locked in its illustrated inwardly projecting position, thereby preventing depression of any of the keys 14 to effect an outgoing call. This will not interfere with use of the hand set 17 to carry on a normal two-way conversation. Upon withdrawing the lock 35, the cover member 30 may be swung upwardly about the hook portion 35 and thus be removed, permitting normal use of the telephone.

DESCRIPTION OF THE EMBODIMENT OF FIGS. 3 AND 4

FIGS. 3 and 4 illustrate a switch plunger depressing member 37 which when combined with a modified form 30a of the cover member 30 of FIG. 1 acts to hold the switch plungers 27, 28 depressed when such cover member is locked in place, even when the handset 17 is removed from its cradle 16. For this purpose, the member 30a is formed with a recess 38 on the underside thereof in which is received the plunger depressing member 37. Such member extends across the member 30a and has raised wings 39 and 40 formed at opposite ends thereof, lying directly over the plungers 27 and 28, respectively, to depress the same when the cover member 30a is locked in place. The member 37 extends between the uprights 24 and 25 on the ledges 27 and 28 and thus cannot be removed when the cover member 30a is locked in place. Thus, with the member 37 in place, neither outgoing calls can be made nor can a two-way conversation be had even if the handset 17 is removed from its cradle. However, if desired, the member 37 may be left off, in which case the cover member 30a will function in the same manner as member 30 of FIGS. 1 and 2 to prevent outgoing calls only.

DESCRIPTION OF THE EMBODIMENT OF FIGS. 5 AND 6

Figure 6:
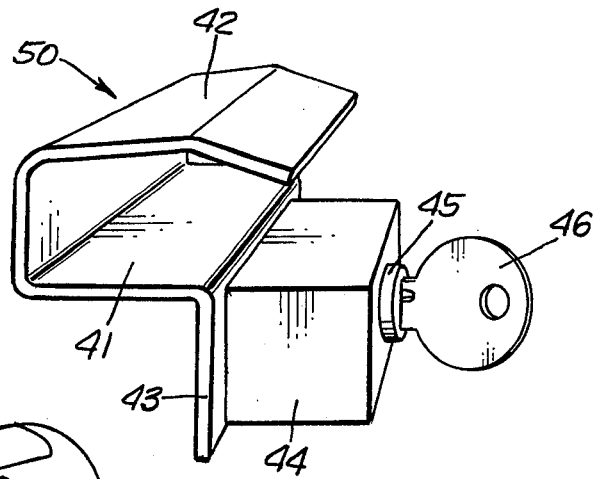
FIG. 6 is a perspective view of the disabling device shown in FIG. 5.

FIGS. 5 and 6 illustrate the form of telephone disabling device with which the present application is concerned. This device is effective, when locked in place, to prevent removal of the handpiece 17 from its cradle 16 and thus prevent both outgoing calls and a two-way conversation to be had. Such disabling device comprises a substantially U-shaped member 50 fitted between the laterally spaced cradle uprights, i.e. 25. Such member has one leg 41 which normally rests against the upper surface 23 of the telephone body 12. An opposite leg 42 of member 40 extends over and rests against the upper surface of the hand set 17 and the top of the two rear cradle uprights 25. The leg 41 is bent downwardly at 43 and this portion is suitably secured to a bearing block 44 carrying a bearing in which a cylinder lock 45, similar to lock 35 of FIG. 2, is mounted. When the lock 45 is inserted in cavity 26, as shown in FIG. 5, and is locked therein by removal of the key 46, the member 40 prevents removal of the handset 17.

DESCRIPTION OF THE EMBODIMENT OF FIG. 7

Figure 7:
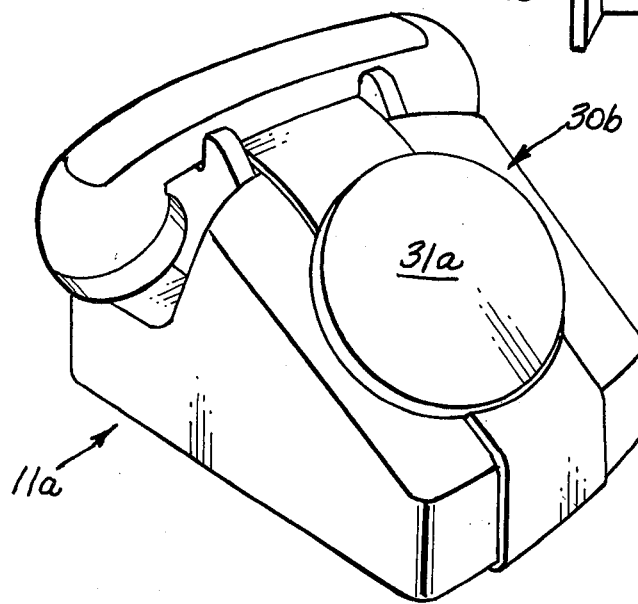
FIG. 7 is a perspective view of a telephone of the finger operated dial type, embodying a modified form of disabling device.

FIG. 7 illustrates a telephone 11a of the finger operated dial type. A locking cover member 30b, similar to member 30, is provided. However, member 30b has a modified cover portion 31a formed to extend over the finger operated dial to prevent manipulation thereof.

It will be obvious to those skilled in the art that many variations may be made in the exact construction shown without departing from the spirit of this invention.

We claim:

1. A telephone disabling device for use on a telephone of the type having a body, including a pair of laterally spaced, horizontal ledges separated by a central plane surface at a slightly lower level, each of the ledges having a pair of spaced apart uprights which cooperate with the ledges to form a cradle to receive the handset of the telephone, and the phone body having a recess extending into the back side thereof directly below the central plane surface, said disabling device comprising:

a strip-like member bent by substantially right-angle bends to form first, second, third and fourth sections, said first section lying flat on the central plane surface of the phone body beneath the handset when the latter is resting in the cradle, said first section extending from the rear edge of the plane surface to a point just in front of the handset;

said second section extending upwardly from the front edge of said first section, in front of the handset;

said third section extending rearwardly over the top of the handset in close proximity thereto;

said fourth section extending downwardly from the rear edge of said first section, directly behind the rear edge of the central plane surface; and a lock mounted on said fourth section and having a retractable part that projects into the recess below the central plane surface;

said lock part engaging the roof of the recess to prevent the said member from being raised with respect to the phone body; said second second section engaging the front of the handset to prevent the disabling device from moving rearwardly; and said third section preventing the handset from being lifted out of the cradle.

* * * * *